US010279484B2

(12) United States Patent
Birglen (10) Patent No.: US 10,279,484 B2
(45) Date of Patent: May 7, 2019

(54) MECHANICAL FINGER FOR GRASPING APPARATUS (71) Applicant: POLYVALOR, LIMITED PARTNERSHIP, Montreal (CA)

(72) Inventor: Lionel Birglen, Brossard (CA)

(73) Assignee: POLYVALOR, LIMITED PARTNERSHIP, Montreal (CA)

( * ) Notice: Subject to any disclaimer, the term of this patent is extended or adjusted under 35 U.S.C. 154(b) by 0 days.

(21) Appl. No.: 15/510,794

(22) PCT Filed: Sep. 11, 2015

(86) PCT No.: PCT/CA2015/050881
§ 371 (c)(1),
(2) Date: Mar. 13, 2017

(87) PCT Pub. No.: WO2016/037288
PCT Pub. Date: Mar. 17, 2016

(65) Prior Publication Data
US 2017/0252930 A1 Sep. 7, 2017

Related U.S. Application Data (60) Provisional application No. 62/049,610, filed on Sep. 12, 2014.

(51) Int. Cl.
*B25J 15/08* (2006.01)
*B25J 15/02* (2006.01)
(Continued)

(52) U.S. Cl.
CPC ............. *B25J 15/08* (2013.01); *B25J 9/1065* (2013.01); *B25J 15/02* (2013.01); *B25J 15/0206* (2013.01);
(Continued)

(58) Field of Classification Search
CPC ........ B25J 15/08; B25J 15/02; B25J 15/0009; B25J 15/0253; B25J 15/12
(Continued)

(56) References Cited

U.S. PATENT DOCUMENTS 1,807,360 A * 5/1931 Wehr .................... B65H 19/126
294/106
4,336,962 A * 6/1982 Read ....................... B66C 1/442
294/106
(Continued)

FOREIGN PATENT DOCUMENTS

CN 101 134 316 A 3/2008
CN 102 601 799 A 7/2012
(Continued)

*Primary Examiner* — Gabriela M Puig
(74) *Attorney, Agent, or Firm* — Norton Rose Fulbright Canada LLP (57) ABSTRACT

A mechanical finger has a base adapted to be connected to an actuator for being displaced in at least one degree of actuation, and has two or more phalanges. A first phalanx is rotationally connected at a proximal end to the base, and a second phalanx is rotationally connected at a proximal end to a distal end of the first phalanx. A transmission linkage providing at least one rotational degree of freedom (DOF) between the base and a distal-most one of the phalanges. Passive rotational DOF joints are between the phalanges, between the base and the first phalanx, and in the transmission linkage, whereby the mechanical finger has a passive state of actuation in which the base, the at least two phalanges and the transmission linkage remain in a constant orientation relative to one another through displacement of the base caused by the actuator absent a contact of one of the phalanges with an object, and a grasping state of actuation in which a contact of at least one of the phalanges with an object causes a variation of the orientation of at least one of
(Continued)

the phalanges relative to the base through displacement of the base caused by the actuator.

20 Claims, 11 Drawing Sheets

(51) Int. Cl.
*B25J 15/12* (2006.01)
*B25J 9/10* (2006.01)
*B25J 15/00* (2006.01)

(52) U.S. Cl.
CPC ............ *B25J 15/12* (2013.01); *B25J 15/0009* (2013.01); *B25J 15/0253* (2013.01)

(58) Field of Classification Search
USPC ...................................... 294/106, 207, 119.1
See application file for complete search history.

(56) References Cited

U.S. PATENT DOCUMENTS

| | | | |
|---|---|---|---|
| 4,367,891 A | 1/1983 | Wauer et al. | |
| 4,593,948 A * | 6/1986 | Borcea | B25J 13/081 294/106 |
| 4,784,422 A * | 11/1988 | Jones | B25J 15/0028 294/106 |
| 5,762,390 A * | 6/1998 | Gosselin | B25J 15/0009 294/106 |
| 9,533,419 B1 * | 1/2017 | Strauss | B25J 15/12 |
| 9,782,902 B1 * | 10/2017 | Kim | B25J 15/12 |
| 2010/0181792 A1 | 7/2010 | Birglen | |
| 2011/0217154 A1 * | 9/2011 | Motonaga | B25J 15/0253 414/732 |
| 2012/0025553 A1 | 2/2012 | Fischer et al. | |
| 2013/0285401 A1 * | 10/2013 | Price | B66C 1/44 294/106 |
| 2014/0097631 A1 | 4/2014 | Ciocarlie et al. | |
| 2014/0265401 A1 * | 9/2014 | Allen Demers | B25J 15/0009 294/201 |
| 2015/0028613 A1 * | 1/2015 | Nakayama | B25J 15/12 294/196 |
| 2015/0115636 A1 * | 4/2015 | Shiomi | B25J 15/12 294/106 |
| 2017/0282379 A1 * | 10/2017 | Nakayama | B25J 15/0028 |

FOREIGN PATENT DOCUMENTS

| | | |
|---|---|---|
| CN | 102717393 A | 10/2012 |
| CN | 103 552 086 A | 2/2014 |
| CN | 103552086 A | 2/2014 |
| CN | 203 665 544 U | 6/2014 |
| CN | 203665544 U | 6/2014 |
| CN | 104858883 A | 8/2015 |
| DE | 10 2005 010380 A1 | 9/2006 |

* cited by examiner

MECHANICAL FINGER FOR GRASPING APPARATUS

CROSS-REFERENCE TO RELATED APPLICATION

The present application claims the priority of U.S. Provisional Patent Application No. 62/049,610, filed on Sep. 12, 2014, and incorporated herein by reference.

TECHNICAL FIELD

The present application relates to mechanical fingers of grasping apparatuses, for instance in robotic applications.

BACKGROUND OF THE ART

In the field of robotized grasping apparatuses, there are conflicting design criteria. On the one hand, grasping apparatuses must often be capable of reproducing human-like manipulations, such as a pinch grasp and enveloping grasp (a.k.a., power grasp). A pinch grasp is equivalent to the grasping of minute objects with the finger tips, while an enveloping grasp involving enveloping a larger object with at least a pair of fingers, with the phalanges of the fingers conforming to the shape of the object.

On the other hand, in spite of these intricate grasping movements (i.e., the pinch grasp), it is often desired to simplify the conception of grasping apparatuses, for instance by reducing the number of parts, simplifying the fabrication and assembly processes, reducing the number of degrees of actuation required, and/or by using off-the-shelf components. For instance, off-the-shelf grippers are available, and adapting mechanical fingers to such off-the-shelf grippers could prove to be cost effective.

SUMMARY

It is therefore an aim of the present application to provide a mechanical finger that addresses issues related to the prior art.

Therefore, in accordance with an embodiment of the present disclosure, there is provided a mechanical finger comprising: a base adapted to be connected to an actuator for being displaced in at least one degree of actuation; at least two phalanges, with a first phalanx rotationally connected at a proximal end to the base, and at least a second phalanx rotationally connected at a proximal end to a distal end of the first phalanx; a transmission linkage providing at least one rotational degree of freedom (DOF) between the base and a distal-most one of the phalanges; and passive rotational DOF joints between the at least two phalanges, between the base and the first phalanx, and in the transmission linkage, whereby the mechanical finger has a passive state of actuation in which the base, the at least two phalanges and the transmission linkage remain in a constant orientation relative to one another through displacement of the base caused by the actuator absent a contact of one of the phalanges with an object, and a grasping state of actuation in which a contact of at least one of the phalanges with an object causes a variation of the orientation of at least one of the phalanges relative to the base through displacement of the base caused by the actuator.

Further in accordance with the embodiment, the passive rotational DOF joints are revolute joints, rotational axes of all said revolute joints being parallel.

Still further in accordance with the embodiment, stoppers are between at least some of the transmission linkage, the base and the distal-most one of the phalanges to delimit rotation of associated ones of the passive rotational DOF joints and so constrain movement of the distal-most one of the phalanges in the grasping state of actuation.

Still further in accordance with the embodiment, a biasing member is provided for at least one of stoppers to bias the mechanical finger to an initial configuration in the passive state of actuation.

Still further in accordance with the embodiment, the initial configuration of the mechanical finger has an object grasping surface of the distal-most one of the phalanges being transverse to a direction of the displacement of the base.

Still further in accordance with the embodiment, the initial configuration of the mechanical finger has an object grasping surface of all of the phalanges being transverse to a direction of the displacement of the base.

Still further in accordance with the embodiment, there are at least four of the revolute joints.

Still further in accordance with the embodiment, there are three of said phalanges, wherein the distal-most one of the phalanges is a third phalanx rotationally connected at a proximal end to a distal end of the second phalanx, and further wherein the transmission linkage is connected to the third phalanx.

Still further in accordance with the embodiment, the transmission linkage is a single revolute joint.

Still further in accordance with the embodiment, the transmission linkage has at least one link with revolute joints at opposed ends.

Still further in accordance with the embodiment, the mechanical finger has two said phalanges, with the first phalanx being configured to act as a flexure bearing forming the passive rotational DOF joints between the base and the second phalanx.

Still further in accordance with the embodiment, the transmission linkage is configured to act as a flexure bearing between the base and the distal-most one of the phalanges.

Still further in accordance with the embodiment, at least one stopper is between the transmission linkage and the distal-most one of the phalanges to delimit a rotation of the flexure bearing and so constrain movement of the distal-most one of the phalanges in the grasping state of actuation.

Still further in accordance with the embodiment, the mechanical finger is made of a single monolithic piece.

Still further in accordance with the embodiment, a notch is in the distal-most phalanx to allow a positioning of a cylindrical object therein.

Still further in accordance with the embodiment, a nail projects at the distal-most phalanx.

Still further in accordance with the embodiment, the transmission linkage is unconnected to any of the phalanges other than the distal-most one of the at least two phalanges.

Still further in accordance with the embodiment, a grasping apparatus comprises at least two of the mechanical finger as described above, the mechanical fingers oriented for the phalanges of one said mechanical finger to face the corresponding phalanges of the other said mechanical finger; and at least one said actuator to displace the mechanical fingers toward and away from one another in the passive state of actuation and in the grasping state of actuation.

Still further in accordance with the embodiment, the at least one said actuator is a parallel gripper having two supports moving in parallel directions of translation, each of the mechanical fingers having its base fixed to a respective one of the supports.

Still further in accordance with the embodiment, the at least one said actuator is a radial gripper having two supports moving in opposite directions of an orientation, each of the mechanical fingers having its base fixed to a respective one of the supports.

Still further in accordance with the embodiment, the two supports rotate about a common axis.

In accordance with another embodiment of the present disclosure, there is provided a mechanical finger comprising: at least two phalanges, with a first phalanx pivotally connected at a proximal end to a base, and at least a second phalanx pivotally connected at a proximal end to a distal end of the first phalanx; a transmission linkage between the base and an end one of the phalanges such as described in U.S. Pat. No. 87,2096,462; stoppers between at least some of the links, the phalanges, and the base to block rotation of links in at least one orientation to constrain movement of the end one of the phalanges in grasping actions.

In accordance with another embodiment of the present disclosure, there is provided a mechanical finger comprising: at least two phalanges, with a first phalanx connected at a proximal end to a base, and a second phalanx connected at a proximal end to a distal end of the first phalanx; a transmission linkage between the base and an end one of the phalanges, the transmission linkage unconnected to any of the phalanges other than the end one of the phalanges, the transmission linkage being configured so as not to constrain the degrees of freedom of the mechanical finger in a grasping action; and at least the first phalanx being configured to act as a flexure bearing between the base and the end one of the phalanges.

In accordance with an embodiment of the present disclosure, there is provided a mechanical finger comprising at least two phalanges, with a first phalanx pivotally connected at a proximal end to a base, and at least a second phalanx pivotally connected at a proximal end to a distal end of the first phalanx; a transmission linkage between the base and an end one of the phalanges, the transmission linkage unconnected to any of the phalanges other than the end one of the phalanges, the transmission linkage being constituted by at least one joint connecting the base and the end one of the phalanx; and stoppers between at least some of the two links, the base and the end one of the phalanges to block rotation and/or translation of links in at least one orientation to constrain movement of the end one of the phalanges in grasping actions.

In accordance with an embodiment of the present disclosure, there is provided a mechanical finger comprising at least two phalanges, with a first phalanx pivotally connected at a proximal end to a base, and at least a second phalanx pivotally connected at a proximal end to a distal end of the first phalanx; a transmission linkage between the base and an end one of the phalanges and having at least one revolute joint pivotally connecting the base and pivotally connected to the end one of the phalanges, the transmission linkage unconnected to any of the phalanges other than the end one of the phalanges; at least four of the revolute joints between the transmission linkage, the base, and the phalanges; and stoppers between at least some of the transmission linkage, the base and the end one of the phalanges to block rotation and/or translation of links in at least one orientation to constrain movement of the end one of the phalanges in grasping actions.

DETAILED DESCRIPTION

Figure 1:
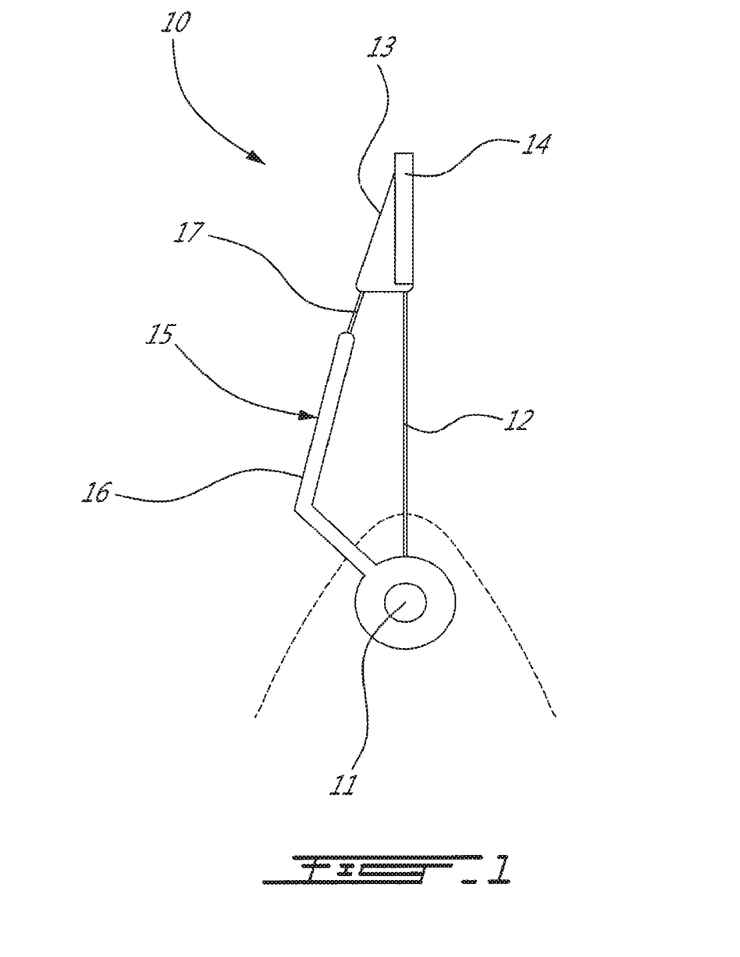
FIG. 1 is a schematic view of a mechanical finger in accordance with a first embodiment of the present disclosure.
Figure 2A:
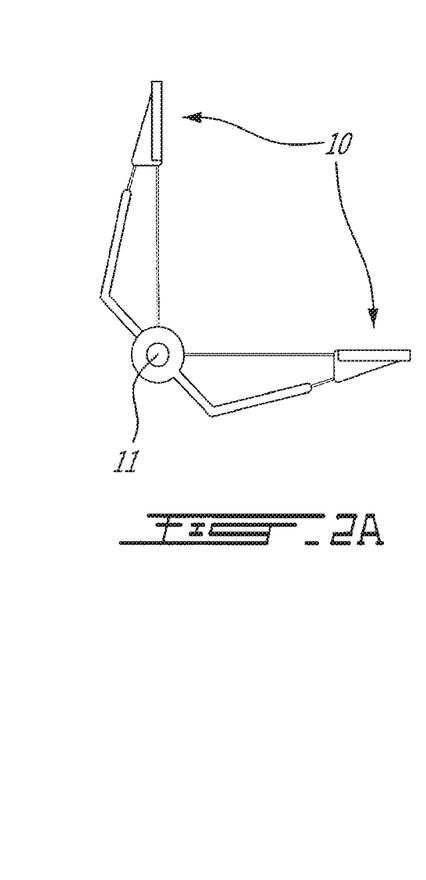
FIGS. 2*a* to 2*d* are sequential views showing a pair of the mechanical finger of FIG. 1, performing a closing motion without any object present.
Figure 2B:
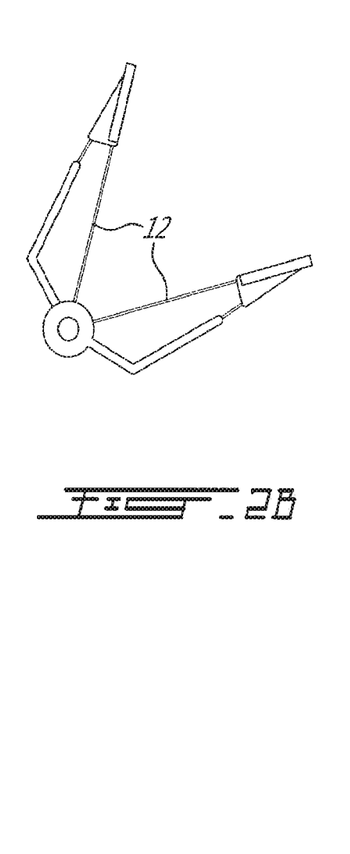
Figure 2C:
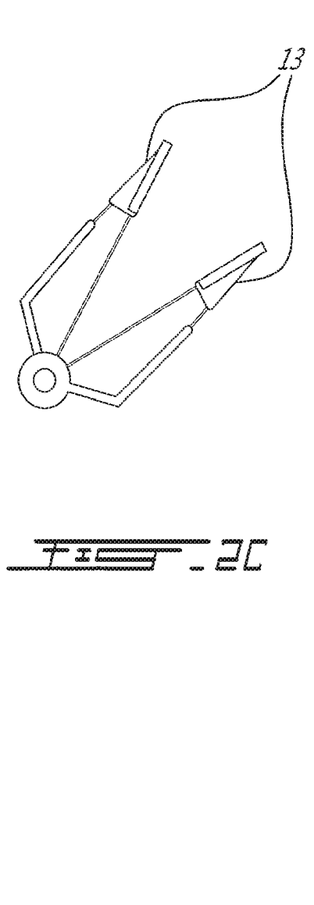
Figure 2D:
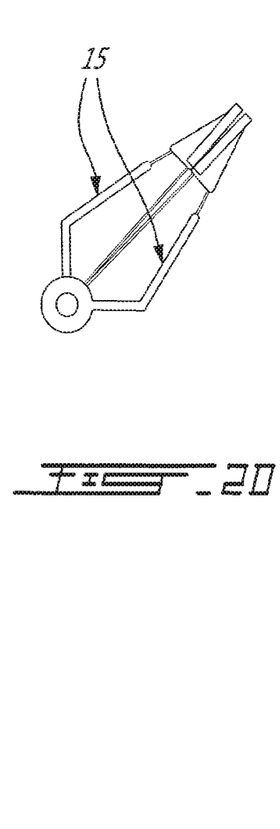
Figure 3A:
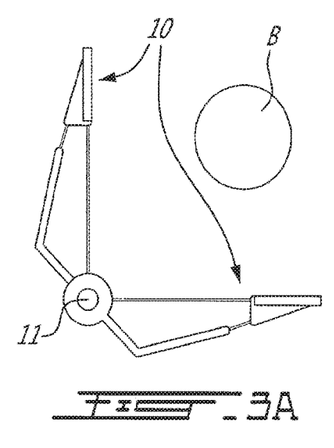
FIGS. 3*a* to 3*d* are sequential views showing a pair of the mechanical finger of FIG. 1, performing a pinch grasp.
Figure 3B:
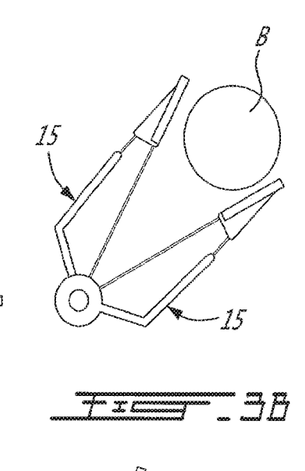
Figure 3C:
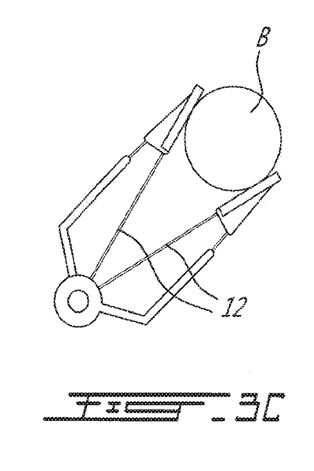
Figure 3D:
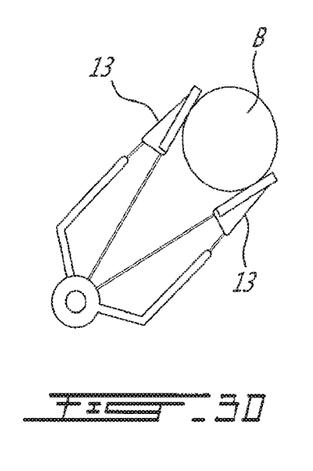
Figure 3E:
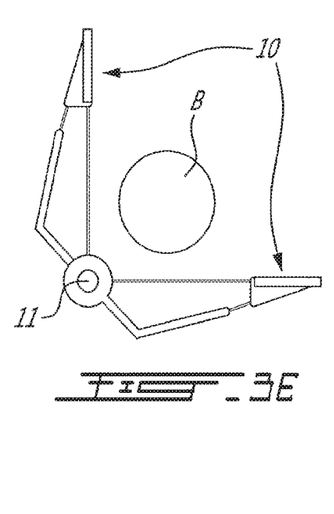
FIGS. 3*e* to 3*h* are sequential views showing a pair of the mechanical finger of FIG. 1, performing an enveloping grasp.
Figure 3F:
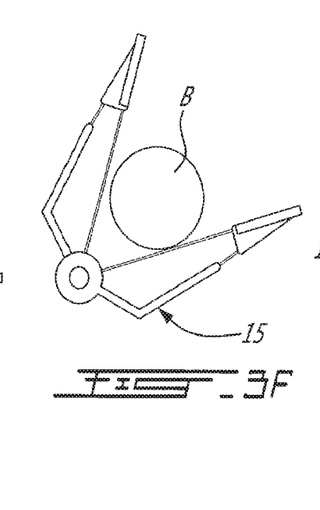
Figure 3G:
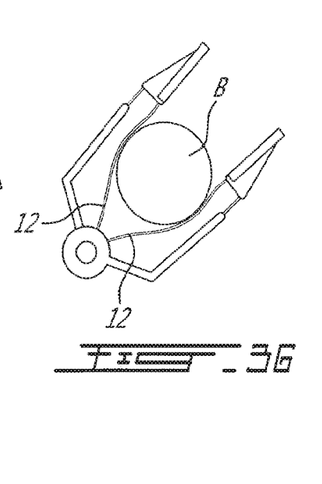
Figure 3H:
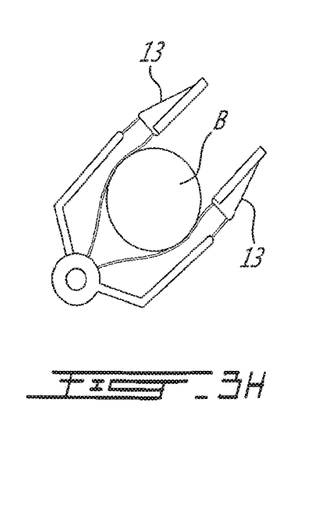

Referring to the drawings and more particularly to FIG. 1, a mechanical finger in accordance with a first embodiment of the present disclosure is generally shown at 10. "Mechanical finger" is one of the numerous expressions that may be used to designate the item 10 of FIG. 1, other expressions including gripper, finger, arm, jaw, etc. Moreover, although the environment of the mechanical finger 10 is not shown, the mechanical finger 10 may be used as part of a hand, a grasping apparatus, a gripping apparatus, a robotized arm, etc. The mechanical fingers 10 may or may not be provided with motorization. According to an embodiment, the mechanical fingers described herein are entirely formed of passive joints in that, during use, none of the joints of the joints of the mechanical finger are directly actuated. Instead, the mechanical finger has a whole is moved, and movement of some parts of the mechanical finger relative to others are caused by grapsing contact of an object, as described hereinafter.

The mechanical finger 10 has a base 11. By base 11, the present disclosure refers to the fact that the mechanical finger 10 has its components move relative to this base 11, with the base 11 being the interface of the mechanical finger 10 with a remainder of a gripping apparatus or like component. In the embodiment of FIG. 1, the base 11 is in the form of a circular female connector of a revolute joint (a male connector could be used as well). Other configurations are considered, but this shape of base 11 is well suited to interconnect two mechanical fingers 10 about a common pivot in the manner shown in FIGS. 2a-2d, such that a pair of mechanical finger 10 may rotate about a common axis of rotation, although the pair of mechanical fingers 10 could rotate about separate axes of rotation as well. According to an embodiment, the mechanical fingers 10 are mounted to a radial gripper.

A proximal flexure phalanx 12 projects from the base 11 and has at its distal end a distal tip phalanx 13, with for instance a contact pad 14. The proximal flexure phalanx 12 has a proximal end integrally connected to the base 11, and a distal end integrally connected to the distal tip phalanx 13. A transmission linkage 15 is in parallel to the proximal flexure phalanx 12. The transmission linkage 15 is constituted of a proximal rigid link 16 and a distal flexure link 17. The proximal rigid link 16 is shaped as an elbow and has one end connected integrally to the base 11 and an opposite end connected integrally to the distal flexure link 17. The distal end of the distal flexure link 17 is connected to the distal tip phalanx 13. The transmission linkage 15 may have different shapes, as alternatives to an elbow. For instance, the transmission linkage 15 may be relatively straight when not deformed and, in such a case, spaced apart from the phalanges 12 and 13.

In FIG. 1, the mechanical finger 10 is monolithically formed from a single material, although it is considered to use a different material in the phalanges 12, 13, the transmission linkage 15. For instance, materials of all sorts may be used, such as resilient pads or even rigid pads for particular uses, such as a tungsten carbide insert as contact pad 14. In the embodiment of FIG. 1, in which the finger 10 is a monolithic piece, the proximal flexure phalanx 12 and the distal flexure link 17 are thinner than the distal tip phalanx 13 and the proximal rigid link 16. Hence, the proximal flexure phalanx 12 and the distal flexure link 17 are typically designed to act as flexure bearings and deform within or beyond the elastic deformation range to allow movement of the phalanges 12 and 13 into some of the grasps, while the distal tip phalanx 13 and the proximal rigid link 16 deform substantially less if not at all. Alternatively, the proximal flexure phalanx 12 and the distal flexure link 17 may consist of a material or materials have a lower modulus of elasticity than that of the material or materials of the distal tip phalanx 13 and the proximal rigid link 16. As a result, each of the flexure bearings may allow one or more rotational degree of freedom (especially when elongated as is the case for the proximal flexure phalanx 12) to allow the enveloping grasp or pinch grasp of objects, as described hereinafter.

Figure 5:
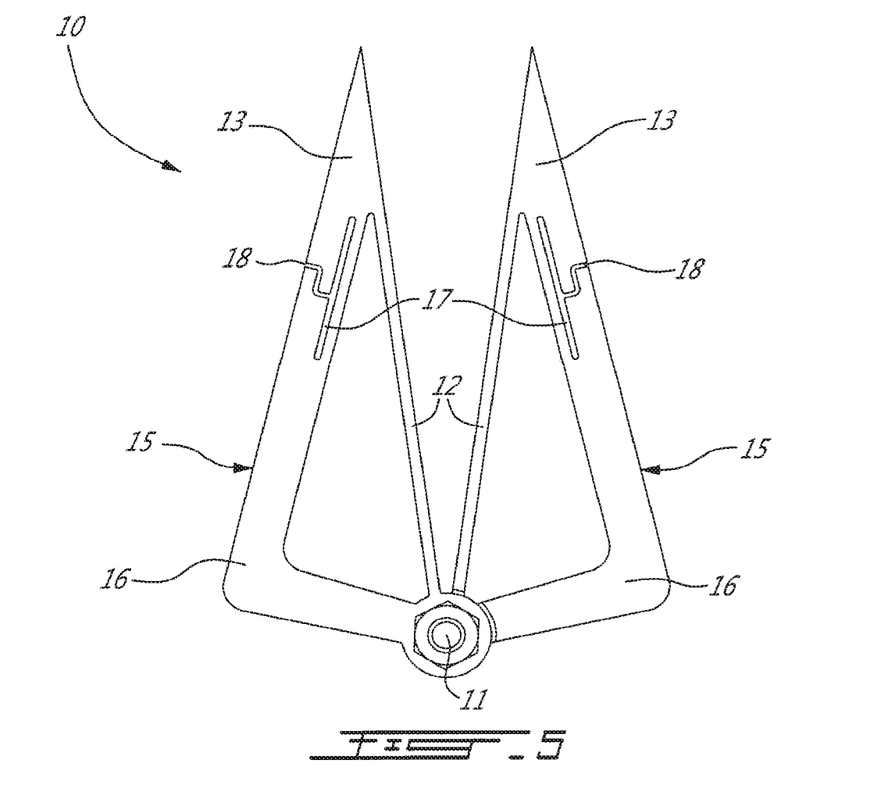
FIG. 5 is a perspective view of the mechanical finger of FIG. 1, with a stopper.

Referring to FIGS. 2a-d and 3a-h, the mechanical finger 10 is arranged in pairs about a common axis of rotation A. In FIGS. 2a to 2d, the mechanical fingers 10 are rotated sequentially toward one another to perform a closing action, while FIGS. 3a to 3d show a pinch grasp. Namely, regarding FIGS. 3a to 3d, the distal tip phalanges 13 are gradually brought toward one another until an object B is pinched between the distal tip phalanges 13 and for instance squeezed between the inserts 14 at the tips. In a pinch grasp, the proximal flexure phalanx 12 and the distal flexure link 17 do not substantially deform. Alternatively, their deformation may be limited by one or several mechanical stoppers 18, as in FIG. 5.

In FIGS. 3e to 3h, an enveloping grasp is shown with respect to object B. Object B is illustrated as being a cylindrical object having a substantially circular section, although the mechanical fingers 10 could grasp objects having other shapes as well. In performing an enveloping grasp, the object B is aligned with the proximal flexure phalanges 12. As the mechanical fingers 10 are rotated toward one another in response to a degree(s) of actuation, the proximal flexure phalanges 12 elastically deform to conform to the shape of the object B. The presence of the distal flexure links 17 in the transmission linkages 15 of each of the mechanical fingers 10 allows the compliance of the proximal flexure phalanges 12 in the manner shown in FIGS. 3g and 3h, and hence enables the inward movement of the distal tip phalanges 13 to close in on the object B. The proximal flexure phalanges 12 and distal flexure links 17 each act as flexure bearings in the mechanical fingers 10, i.e., in that they allow motion of the distal tip phalanges by bending. Other types of flexure bearings may be used, such as elastics, wires, etc.

Although the plan views in FIGS. 2 and 3 show only a pair of the mechanical finger 10, it is considered to have more than the two mechanical fingers 10. For example, three of the mechanical fingers 10 could be used to perform an enveloping grasp of spherical objects such as balls. In such instances, it may be considered to have the bases 11 share a rotational axis, or the bases 11 of the fingers 10 may each have its own rotational axis. It is also considered to underactuate the mechanical fingers 10 in the arrangements of FIGS. 2 and 3 or in arrangements with more than two mechanical fingers 10, by using an appropriate transmission.

During operation, the transmission linkage 15 is configured so as not to constrain the degrees of freedom of the mechanical finger 10, and hence allow movement of the distal phalanx 13 relative to the base 11 in the manner detailed in the sequences of FIGS. 2 and 3. Moreover, due to the bending of the proximal flexure phalanges 12, the transmission linkage 15 may help in transmitting the degree of actuation to the distal phalanges 13, as the length of the distal flexure links 17 of the transmission linkages 15 is substantially less than that of the proximal flexure phalanges 12. FIGS. 3a-h also illustrate a passive state of actuation and a grasping state of actuation of the mechanical fingers 10. As mentioned previously, the mechanical finger 10 is formed of passive rotational DOF joints, in that none of the joints between the base 11, the phalanges 12 and 13, and the transmission linkage 15 are actuated. Instead, the base 11 is displaced, and the mechanical finger 10 moves as a whole. In FIGS. 3a-3c and FIGS. 3e-3f, the mechanical fingers 10 are in the passive state of actuation: there is no relative movement between the components of the individual mechanical fingers 10, i.e., the orientation between the base 11, the phalanges 12 and 13, and the transmission linkage 15 remains constant, in spite of the mechanical fingers closing in on each other. In FIG. 3d and FIGS. 3g-3h, the grasping state of actuation is shown: this state of actuation implies a variation of the orientation of phalanges 12 and/or 13 relative to the base 11, as a result of contact with the object B through displacement of the base(s) 11. Therefore, the mechanical finger 10 is in the passive state of actuation absent some contact with the object or with some specific contacts with the object, and in the grasping state of actuation when the finger 10 deforms to the contact of the object.

It is considered to solely have non-bending links and pivots for the transmission linkages 15 as an alternative to a flexure bearing. For example, referring now to FIG. 4, there is illustrated a parallel gripper 20 in accordance with the prior art. The parallel gripper 20 is of the type that is commonly used in robotic devices. The illustrated model may correspond to model HGPL14-80 from Festo, given solely as an example. Other similar parallel grippers 20 may also be used with mechanical fingers as defined hereinafter. The parallel gripper 20, as per its conventional construction, has a base 21 of elongated shape, in which a pair of slots 22 are defined. The slots 22 are T-shaped slots but may also adopt different shapes. Each of the slots 22 receives a gripper jaw 23, the gripper jaws 23 being supports for the mechanical fingers 10 or mechanical fingers 30 described hereinafter. Therefore, the gripper jaws 23 may translate in the elongated direction of the base 21, in translational movement (e.g., parallel directions). In an embodiment, the gripper jaws 23 move concurrently as a response to a single degree of actuation, or independently from one another with different degrees of actuation.

Figure 6A:
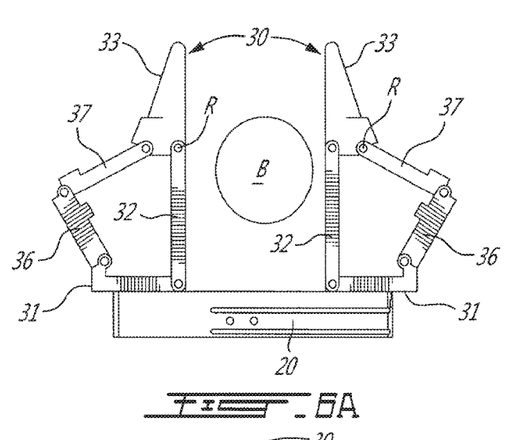
FIGS. 6*a* to 6*d* are sequential elevation views of a pair of the mechanical finger used with the parallel gripper of FIG. 4, performing an enveloping grasp.
Figure 6B:
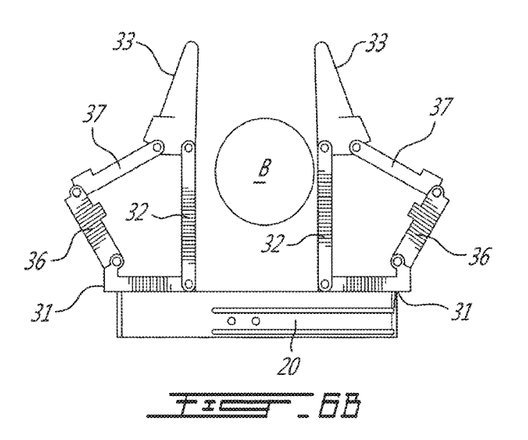
Figure 6C:
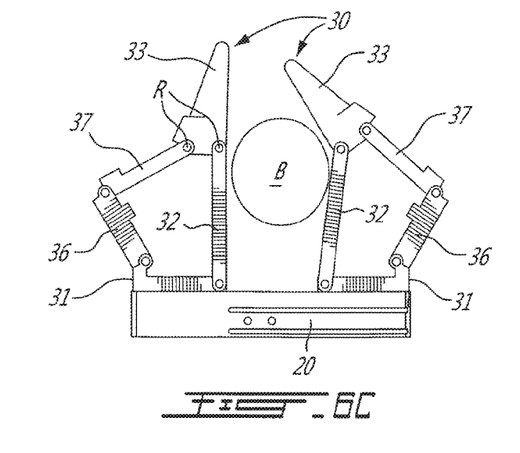
Figure 6D:
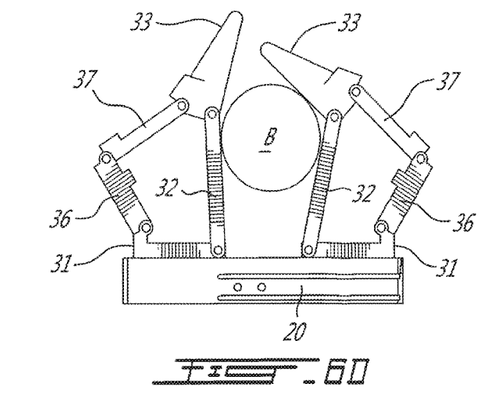
Figure 7A:
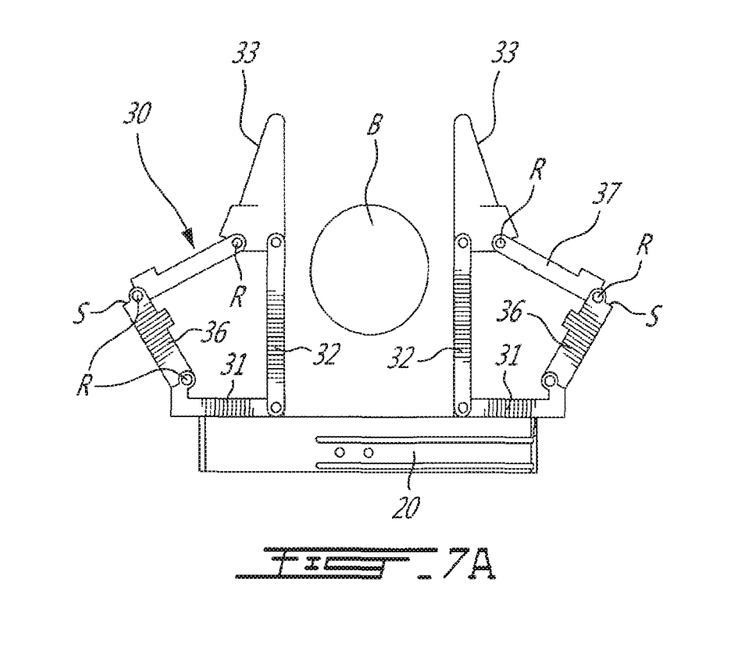
FIGS. 7*a* and 7*b* are sequential elevation views of the pair of the mechanical finger of FIG. 5 performing a pinch grasp.
Figure 7B:
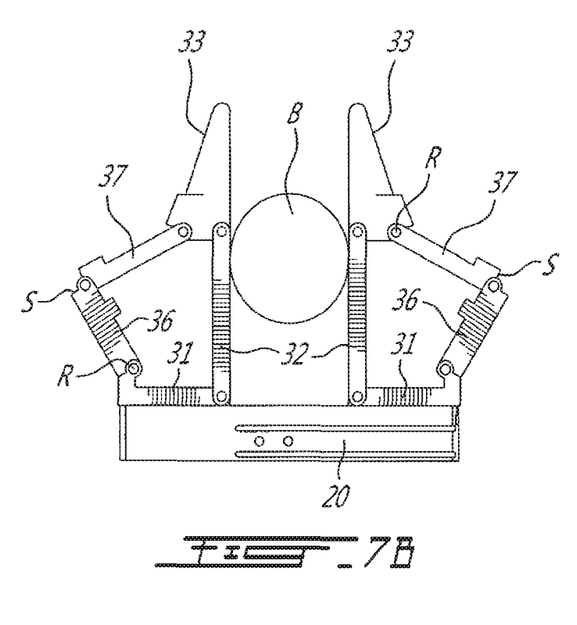

Referring to FIGS. 6 and 7, there is illustrated a pair of mechanical fingers 30 connected to the gripper jaws 23 of the parallel gripper 20. The mechanical fingers 30 are of the same configuration as one another, and are arranged in mirror fashion in FIGS. 6 and 7, with corresponding phalanges being face to face, as was the case for the mechanical fingers 10. Each of the mechanical fingers 30 has a base 31 connected to a respective gripper jaw 23, whereby the bases 31 may move toward or away from one another, the movements being responsive to actuation from the parallel gripper 20. In spite of the fact that the base 31 moves relative to the parallel gripper 20, it is referred to as a "base" as a remainder of the mechanical finger 30 may move relative to the base 31, in the grasping state of actuation.

Each of the fingers 30 has a proximal phalanx 32 pivotally connected to the base 31 by a revolute joint R (a.k.a., hinge, rotational degree of freedom (DOF) joint, pivot joint, rotational joint). A distal end of the proximal phalanx 32 is pivotally connected by another revolute joint R to a distal phalanx 33. A transmission linkage 35 also relates the base 31 to the distal phalanx 33. The transmission linkage 35 comprises a proximal link 36 and a distal link 37. The proximal link 36 is connected to the base 11 by another revolute joint R. It is observed that the base 31 may have a raised portion for the revolute joint R of the proximal link 36 to be above that of the proximal phalanx 32. The distal end of the proximal link 36 is connected to the distal link 37 by another revolute joint R, while the distal end of the distal link 37 is connected to the distal phalanx 33 by way of another revolute joint R as well. In the mechanical finger 30, the rotation axes of all of these revolute joints R are parallel to one another. It is observed that the proximal link 36 and the distal link 37 have stoppers S and are hence shown in FIG. 5 as being in a limit position, in that the proximal links 36 and the distal links 37 can only move in one direction of the orientation when stopped, as they are blocked in the other direction of the orientation by an abutment with the adjacent link, base or phalanx, the stoppers S delimiting the range of rotation. These stoppers S can be located in other joints of the mechanisms providing that their aim is kept, namely to prevent the opening motion of the distal phalanx. Accordingly, the abutment configuration shown in FIG. 5 results in the links 36 and 37 constraining some of the movements of the associated phalanx 32. Moreover, the stoppers S, for instance used with biasing device, may keep the phalanges in a desired initial configuration, faciliting the adaptation of the finger 30 to different types of grasp. For example, the stoppers S may be placed for an object grasping surface of the distal-most one of the phalanges to be transverse or perpendicular to a direction of the displacement of the base 31. According to an example, the object grasping surface of all of the phalanges are transverse or perpendicular to a direction of the displacement of the base 31. This is shown in FIGS. 6a and 6b.

Referring to FIGS. 6a and 6b, there is illustrated the mechanical fingers 30 performing an enveloping grasp of object B. The object B is aligned with the proximal phalanges 32 of the mechanical finger 30 and the parallel gripper 20 brings the mechanical fingers 30 toward one another until contact is reached as in FIGS. 6c and 6d. Therefore, the mechanical fingers 30 are in their passive states of actuation in FIGS. 6a and 6b, seeing as the orientation of the various finger components remains constant through movement of the base 31. As shown in FIG. 6c, as the object B contacts the proximal phalanx 32 of the right-side finger 30, the latter will pivot away, while the transmission link 35 will cause the distal phalanges 33 to pivot over the object B (because of the blocking of the proximal link 36), thereby enveloping the object B. As shown in FIG. 6d, the left-hand side mechanical finger 30 reacts in a similar manner. Therefore, the mechanical fingers 30 are in their grasping states of actuation in FIGS. 6c and 6d, seeing as the orientation of the various finger components varies through movement of the base 31. Again, it is observed that none of the joints of the mechanical fingers 30 are directly actuated—it is the finger 30 as a whole that is displaced, and the grasping actions are caused by contact with the object B.

Referring to FIGS. 7a and 7b, the same object B is shown in a pinch grasp, in which the object B is simply caught between the distal phalanges 33. The distal phalanges 33 remain parallel to one another, by the presence of the stoppers S in the transmission linkages 35 that block rotation of the distal phalanges 33 with respect to the proximal phalanges in a pinch grasp and/or the translation of the proximal phalanges away from the grasp area with respect to the base 31. The fingers 30 may remain in the passive states of actuation throughout the pinch grasp of the object B.

Figure 4:
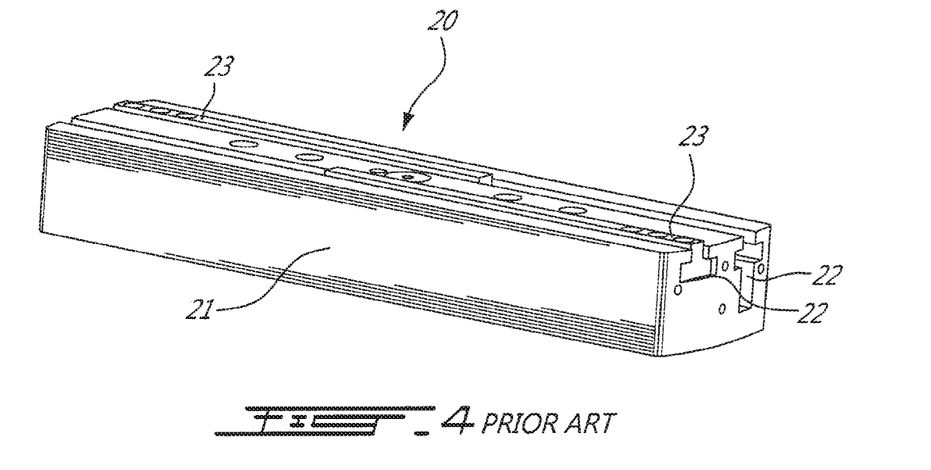
FIG. 4 is a perspective view of a parallel gripper in accordance with the prior art.
Figure 8:
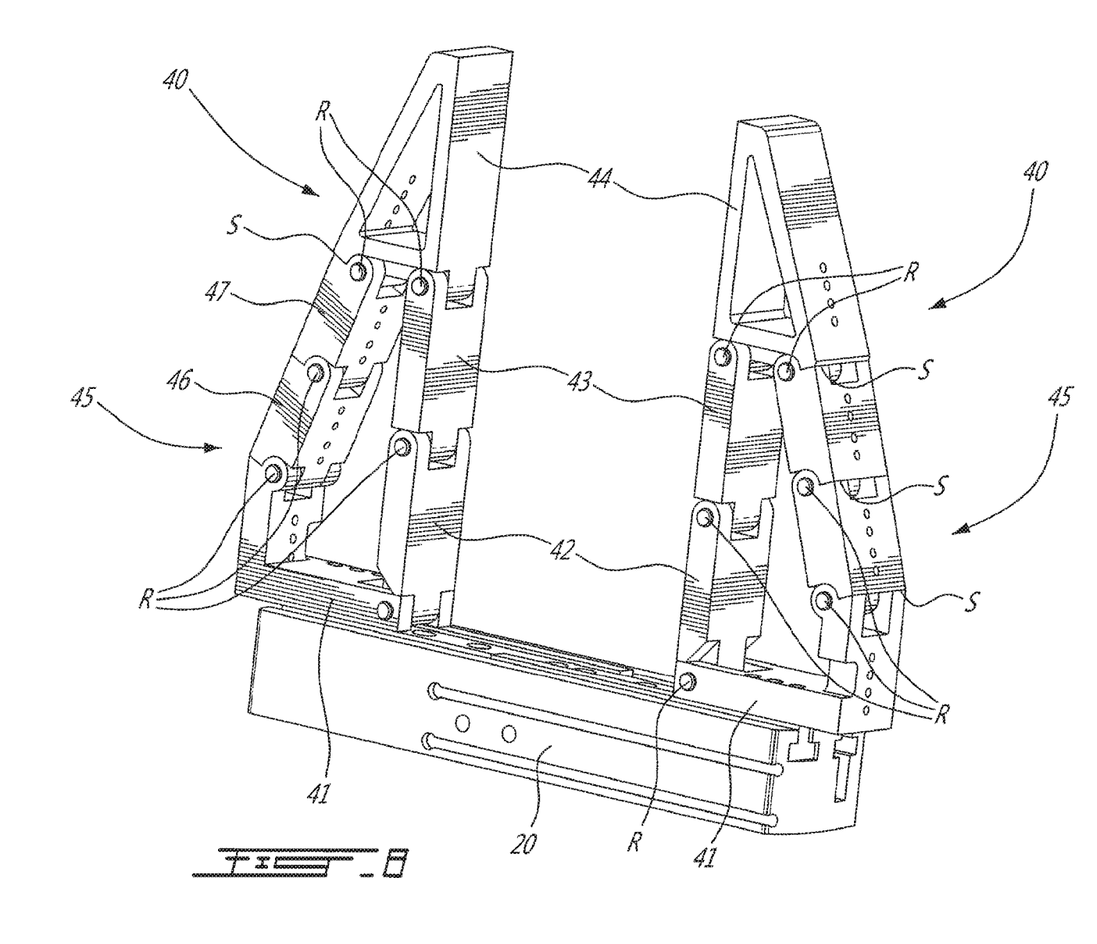
FIG. 8 is a perspective view of a pair of mechanical fingers in accordance with a third embodiment of the present disclosure, as mounted to the parallel gripper of FIG. 4.

Referring to FIG. 8, there is illustrated a pair of mechanical fingers 40 mounted to the parallel gripper 20 described in FIG. 4. The mechanical fingers 40 are similar to the mechanical fingers 30 of FIG. 5, but with an intermediate phalanx between the proximal and distal phalanges. The mechanical fingers 40 each have a base 41 that is connected to one of the gripper jaws 23 for translational movement along the base of the parallel gripper 20, in a single or dual degrees of actuation. Sequentially, the mechanical fingers 40 have a proximal phalanx 42, an intermediate phalanx 43 and a distal phalanx 44. The proximal phalanx 42 is connected at opposed ends to the base 41 and to the intermediate phalanx 43 by way of revolute joints R. Likewise, the intermediate phalanx 43 is connected at opposed ends to the proximal phalanx 42 and to the distal phalanx 44, by way of revolute joints R. A transmission linkage 45 interconnects the distal phalanges 44 to the base 41. The transmission linkage 45 comprises a proximal link 46 and a distal link 47. The proximal link 46 is connected at opposed ends to the base 41 and to the distal link 47, by other revolute joints R. The distal link 47 is also connected at opposed ends to the proximal link 46 and to the distal phalanx 44 by revolute joints R. In the mechanical finger 40, the rotation axes of all of these revolute joints R are parallel to one another.

Figure 9A:
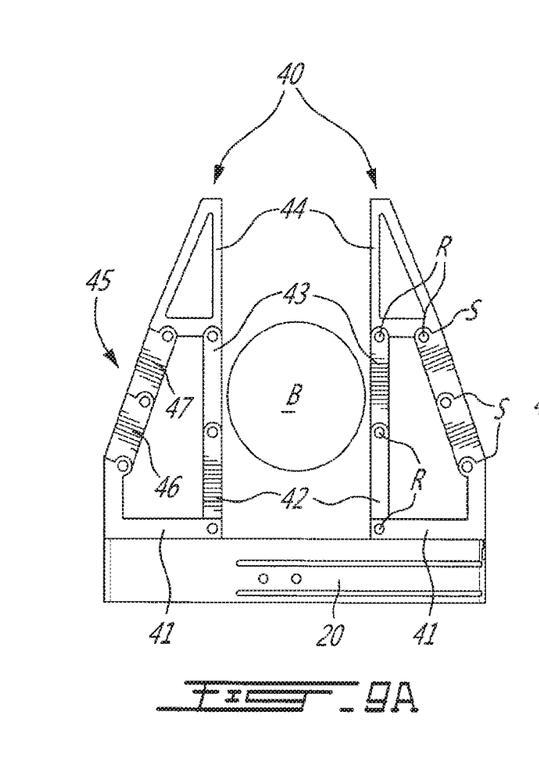
FIGS. 9*a* to 9*c* are sequential elevation views of the pair of the mechanical finger of FIG. 8 performing an enveloping grasp.
Figure 9B:
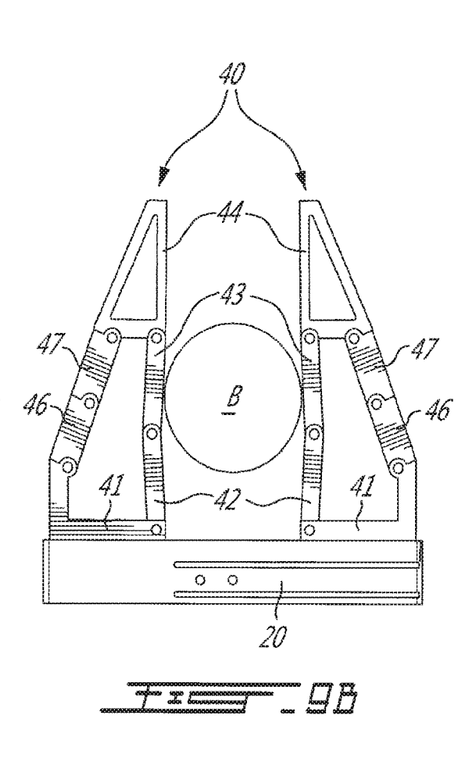
Figure 9C:
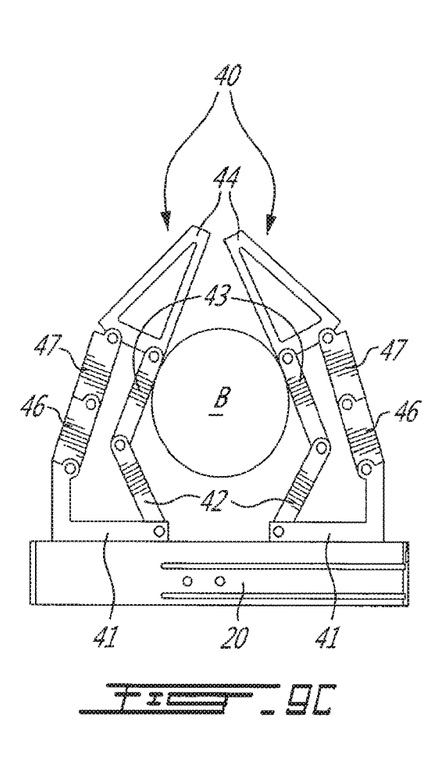

Unlike the phalanges 42 and 43, the proximal link 46 and the distal link 47 have stoppers S by which they may reach a limit position, as in FIG. 8, at which they are limited to rotating inwardly toward the phalanges 42 and 43. There is illustrated in FIGS. 9A to 9C a sequence in which the mechanical fingers 40 concurrently perform an enveloping grasp. As shown in FIGS. 9A and 9B, the mechanical fingers 40 are brought toward one another by action of the parallel gripper 20. As object B contacts the phalanges 42 and 43, these pivot relative to the base 41. The transmission linkage 45 in its limit position ensures that the distal phalanges 44 rotate inwardly, so as to envelop the object B. Again, the rotational joints of the mechanical fingers 40 are passive, and the mechanical fingers 40 have a passive state of actuation and a grasping state of actuation.

Figure 10A:
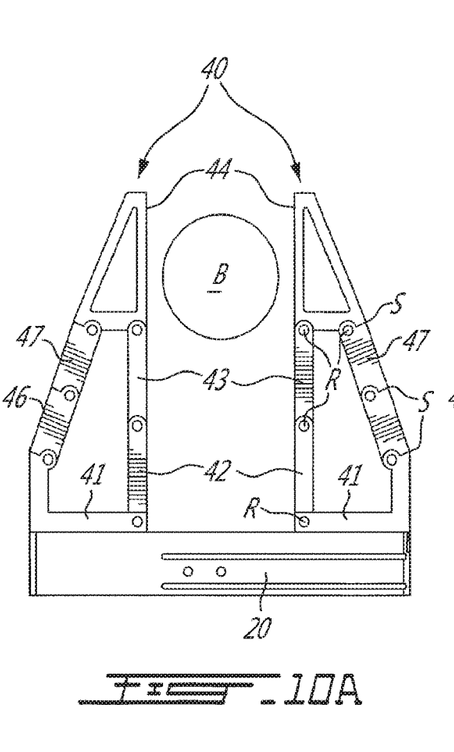
FIGS. 10*a* to 10*c* are sequential elevation views of the pair of the mechanical finger of FIG. 8 performing a pinch grasp.
Figure 10B:
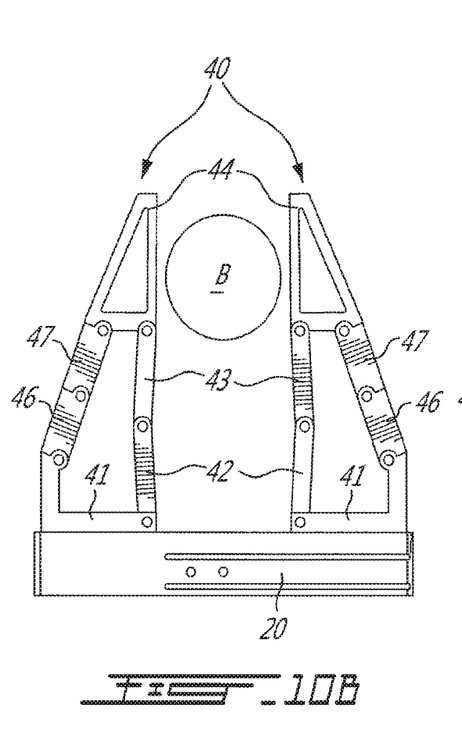
Figure 10C:
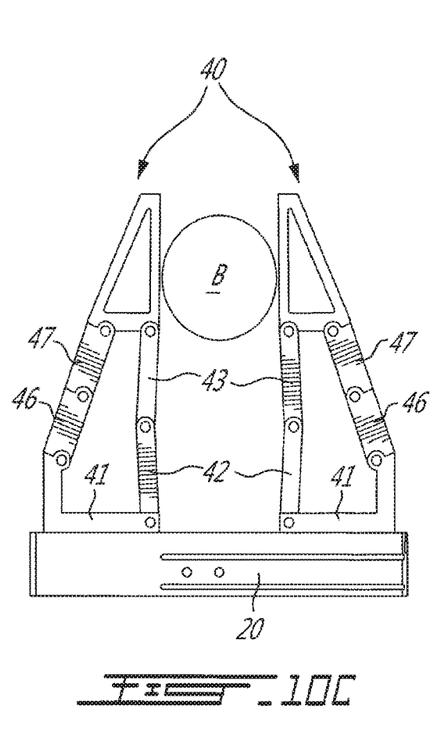

In FIGS. 10A to 10C, the mechanical fingers 40 are shown as performing a pinch grasp. The transmission linkages 45 will ensure that the distal phalanges 44 remain parallel to one another when the object B is caught therebetween.

Figure 11:
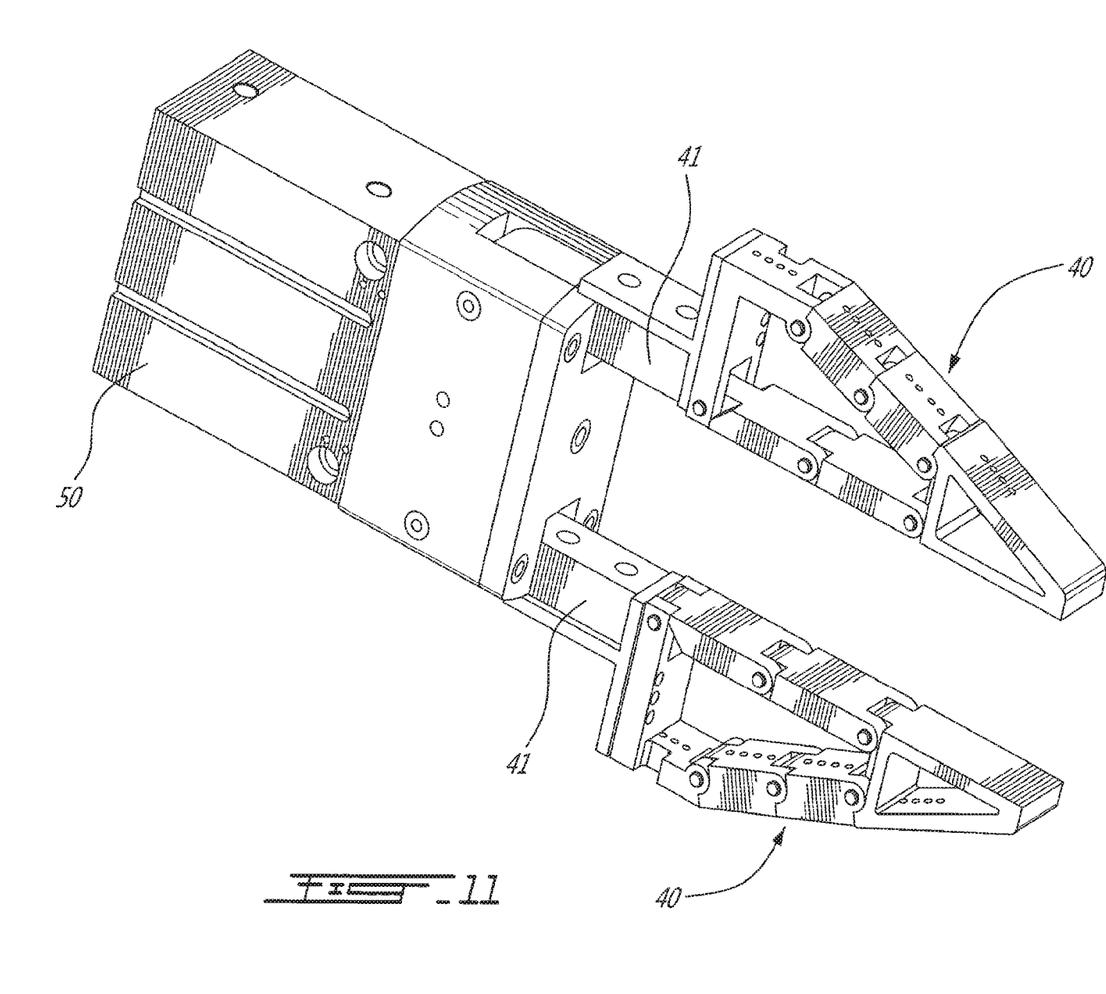
FIG. 11 is a perspective view of the pair of mechanical fingers of FIG. 8, as mounted to a radial gripper of the prior art.

Referring to FIG. 11, an embodiment of the mechanical fingers 40 is shown, in which a radial gripper 50 (e.g., a Festo HGR t-50 for example) is used instead of the parallel gripper 20, the radial gripper 50 having one or more DOAs. The operation of the mechanical fingers 40 is similar to the operation of the mechanical fingers 40 with the parallel gripper 20, to bring the mechanical fingers 40 toward and away from one another. The use of the radial gripper 50 does not affect the passive nature of the joints, and as such the mechanical fingers 40 have a passive state of actuation and a grasping state of actuation.

Multiple other configurations are considered for mechanical fingers of the family including fingers 30, 40 and 50 described above, i.e., fingers with revolute joints, stoppers and transmission linkages. As a hardware requirement, there must be at least four joints between base, phalanges and transmission linkage. Moreover, to be valid, the geometrical parameters of this family of mechanical finger and the transmission linkage including the ranges of motion permitted by the mechanical stoppers must verify the following property: the opening of the distal phalanx in the initial configuration must be prevented while still preserving the enveloping capability of the finger, i.e. the closing motion of the distal phalanx, as will be described below by way of an example for FIG. 12. To ensure both these motions are possible and verify a candidate design, all possible planar motions of an arbitrary point of the distal phalanx may be computed taking into account the mechanical limits in all the joints of the design (i.e., finger and transmission linkage). These planar motions exist in a three-dimensional space describing all translations in the plane and also the rotation around an out-of-the-plane axis. Inside this three-dimensional space, any configuration of the distal phalanx can be represented by a point and the workspace of this distal phalanx is defined as the set of all the points in this 3D space that are physically achievable by the design, i.e. where no geometrical constraints are violated. This workspace is a set of geometrical objects (points, curves or volumes) obtained by intersecting similar geometrical objects obtained by computing the workspaces permitted by first, the phalanges and second, the transmission linkage. This intersection must be non-empty but have no point in the part of the workspace corresponding to an opened state of the distal phalanx. Furthermore, a least one trajectory belonging to the intersection set of these geometrical objects must exist from the point representing the initial assembly configuration of the finger to another part of the intersection set corresponding to a closed configuration. If no such trajectory exists, the design is invalid and the distal phalanx is locked in its initial configuration.

Figure 12:
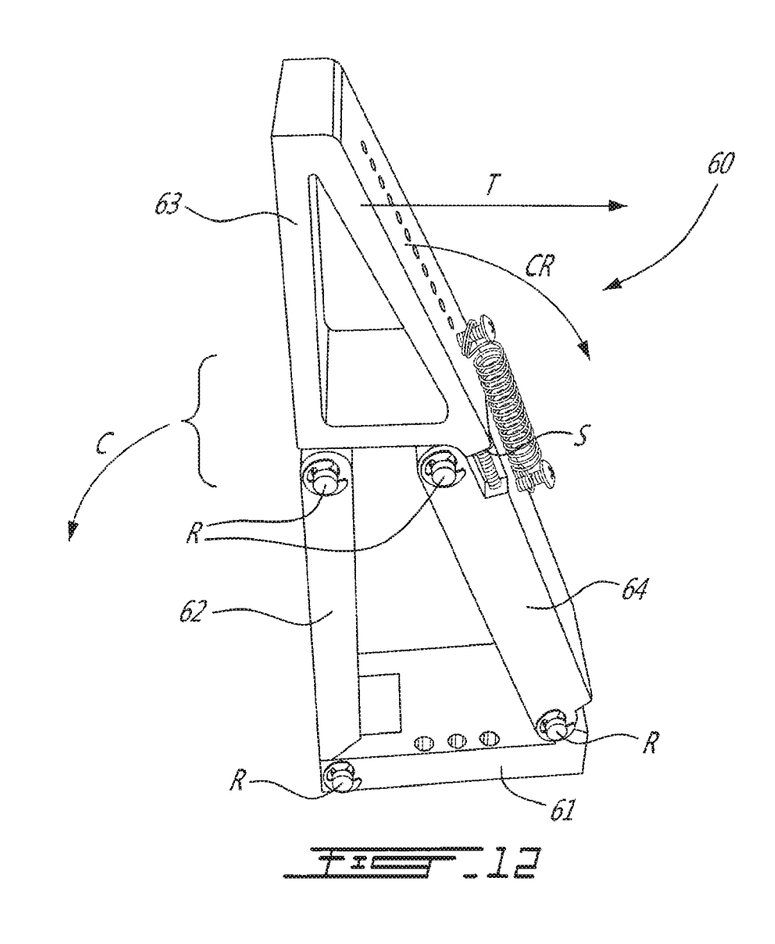
FIG. 12 is a perspective view of a two-phalanx minimum working mechanical finger.
Figure 13:
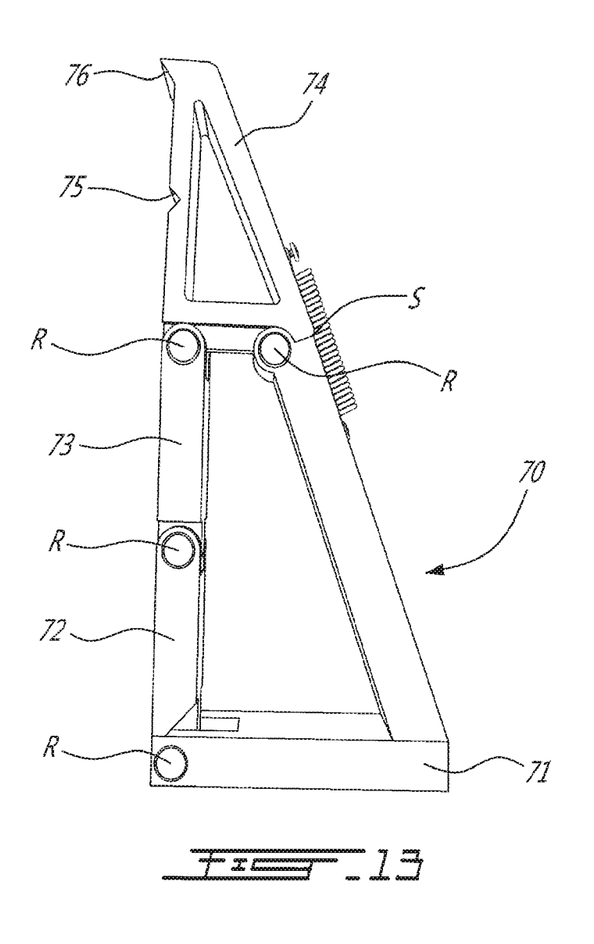
FIG. 13 is a perspective view of a three-phalanx minimum working mechanical finger.

For illustrative purposes, the minimal working configurations for the family of mechanical fingers 30, 40 and 50 are shown in FIGS. 12 and 13. Stated differently, additional links and phalanges may be added to the mechanical fingers of FIGS. 12 and 13 based on the previous paragraph, but the configurations shown in FIGS. 12 and 13 are sufficient to perform enveloping and pinch grasps in the manner detailed above. The minimal working prototypes are shown at 60 and 70, with two and three phalanges respectively.

The mechanical finger 60 has a base 61, a proximal phalanx 62 and a distal phalanx 63. The proximal phalanx 62 is connected at opposed ends to the base 61 and to the distal phalanx 63 by way of revolute joints R. The transmission linkage is constituted of a link 64 pivotally connected at a proximal end to the base 61, and at a distal end to the distal phalanx 63, by way of revolute joints R. The mechanical finger 60 complies with the requirement of a minimal number of four revolute joints have at least one degree of freedom. The mechanical finger 60 complies with the property described above, namely the opening of the distal phalanx 63 is prevented as the distal phalanx 63 cannot move in translation direction T or clockwise rotation CR relative to the base 61, while the mechanical finger 60 effects a closing motion C.

The mechanical finger 70 has a base 71, a proximal phalanx 72, an intermediate phalanx 73 and a distal phalanx 74. The proximal phalanx 72 is connected at opposed ends to the base 71 and to the intermediate phalanx 73 by way of revolute joints R. Likewise, the intermediate phalanx 73 is connected at opposed ends to the proximal phalanx 72 and to the distal phalanx 74 by way of revolute joints R. The transmission linkage is constituted of a single revolute joint R pivotally connecting the base 71 to the distal phalanx 74, the transmission linkage not having any link. A stopper is defined at a junction between the base 71 and the distal phalanx 74 to block opening movement of the distal phalanx 74. The mechanical finger 70 complies with the requirement of a minimal number of four revolute joints have at least one degree of freedom.

In the mechanical fingers described above, the gripping surfaces may be provided with gripping aid, such as higher-friction pads (rubber) or coating, notches, nails, etc. In particular, the notches 75 and nails 76 may be on the distal phalanges, as shown in FIG. 13. Such features may be provided to enhance the gripping of the objects with the mechanical fingers described above. It is also considered to provide biasing units, such as springs, to bias the joints of the transmission linkage to the abutted orientation (e.g., with links blocked at the stopper). For example, one such spring is shown in the mechanical finger 70 of FIG. 13.

The invention claimed is:

1. A mechanical finger comprising:
   a base adapted to be connected to an actuator for being displaced in at least one degree of actuation;
   at least two phalanges, with a first phalanx rotationally connected at a proximal end to the base, and at least a second phalanx rotationally connected at a proximal end to a distal end of the first phalanx;
   a transmission linkage providing at least one rotational degree of freedom (DOF) between the base and a distal-most one of the phalanges;
   passive rotational DOF joints between the at least two phalanges, between the base and the first phalanx, and in the transmission linkage, whereby the mechanical finger has a passive state of actuation in which the base, the at least two phalanges and the transmission linkage remain in a constant orientation relative to one another through displacement of the base caused by the actuator absent a contact of one of the phalanges with an object, the passive state of actuation including an initial configuration in which the at least two phalanges have a desired orientation relative to one another, and a grasping state of actuation in which a contact of at least one of the phalanges with an object causes a variation of the orientation of at least one of the phalanges relative to the base through displacement of the base caused by the actuator; and at least one biasing member to return the at least two phalanges to the desired orientation relative to one another upon release of the object having caused said variation of the orientation.

2. The mechanical finger according to claim 1, wherein the passive rotational DOF joints are revolute joints, rotational axes of all said revolute joints being parallel.

3. The mechanical finger according to claim 2, comprising at least four of the revolute joints.

4. The mechanical finger according to claim 1, further comprising stoppers between at least some of the transmission linkage, the base and the distal-most one of the phalanges to delimit rotation of associated ones of the passive rotational DOF joints and so constrain movement of the distal-most one of the phalanges in the grasping state of actuation.

5. The mechanical finger according to claim 4, wherein the at least one biasing member is a spring for at least one of stoppers to bias the mechanical finger to said initial configuration in the passive state of actuation.

6. The mechanical finger according to claim 5, wherein the initial configuration of the mechanical finger has an object grasping surface of the distal-most one of the phalanges being transverse to a direction of the displacement of the base.

7. The mechanical finger according to claim 5, wherein the initial configuration of the mechanical finger has an object grasping surface of all of the phalanges being transverse to a direction of the displacement of the base.

8. The mechanical finger according to claim 1, comprising three of said phalanges, wherein the distal-most one of the phalanges is a third phalanx rotationally connected at a proximal end to a distal end of the second phalanx, and further wherein the transmission linkage is connected to the third phalanx.

9. The mechanical finger according to claim 1, wherein the transmission linkage is a single revolute joint.

10. The mechanical finger according to claim 1, wherein the transmission linkage has at least one link with revolute joints at opposed ends.

11. The mechanical finger according to claim 1, wherein the mechanical finger has two said phalanges, with the first phalanx being configured to act as the biasing member with a flexure bearing forming the passive rotational DOF joints between the base and the second phalanx.

12. The mechanical finger according to claim 11, wherein the transmission linkage is configured to act as the biasing member with a flexure bearing between the base and the distal-most one of the phalanges.

13. The mechanical finger according to claim 11, further comprising at least one stopper between the transmission linkage and the distal-most one of the phalanges to delimit a rotation of the flexure bearing and so constrain movement of the distal-most one of the phalanges in the grasping state of actuation.

14. The mechanical finger according to claim 11, wherein the mechanical finger is made of a single monolithic piece.

15. The mechanical finger according to claim 1, further comprising in the distal-most phalanx a notch to allow a positioning of a cylindrical object therein.

16. The mechanical finger according to claim 1, wherein the transmission linkage is unconnected to any of the phalanges other than the distal-most one of the at least two phalanges.

17. A grasping apparatus comprising:
at least two of the mechanical finger according to claim 1, the mechanical fingers oriented for the phalanges of one said mechanical finger to face the corresponding phalanges of the other said mechanical finger; and
at least one said actuator to displace the mechanical fingers toward and away from one another in the passive state of actuation and in the grasping state of actuation.

18. The grasping apparatus according to claim 17, wherein the at least one said actuator is one of a parallel gripper having two supports moving in parallel directions of translation, each of the mechanical fingers having its base fixed to a respective one of the supports, and of a radial gripper having two supports moving in opposite directions of an orientation, each of the mechanical fingers having its base fixed to a respective one of the supports.

19. The mechanical finger according to claim 1, comprising three of said phalanges, wherein the distal-most one of the phalanges is a third phalanx rotationally connected at a proximal end to a distal end of the second phalanx, and further wherein the transmission linkage is connected to the third phalanx, and wherein the initial configuration of the mechanical finger has an object grasping surface of all of the phalanges being transverse to a direction of the displacement of the base.

20. A grasping apparatus comprising:
at least one actuator;
at least two of the mechanical finger, each of the mechanical fingers comprising
a base adapted to be connected to the at least one actuator for being displaced in at least one degree of actuation,
at least two phalanges, with a first phalanx rotationally connected at a proximal end to the base, and at least a second phalanx rotationally connected at a proximal end to a distal end of the first phalanx,
a transmission linkage providing at least one rotational degree of freedom (DOF) between the base and a distal-most one of the phalanges,
passive rotational DOF joints between the at least two phalanges, between the base and the first phalanx, and in the transmission linkage, whereby the mechanical finger has a passive state of actuation in which the base, the at least two phalanges and the transmission linkage remain in a constant orientation relative to one another through displacement of the base caused by the actuator absent a contact of one of the phalanges with an object, the passive state of actuation including an initial configuration in which the at least two phalanges have a desired orientation relative to one another, and a grasping state of actuation in which a contact of at least one of the phalanges with an object causes a variation of the orientation of at least one of the phalanges relative to the base through displacement of the base caused by the actuator, and
at least one biasing member to return the at least two phalanges to the desired orientation relative to one another upon release of the object having caused said variation of the orientation;
wherein the mechanical fingers are oriented for the phalanges of one said mechanical finger to face the corresponding phalanges of the other said mechanical finger; and
wherein said actuator displaces the mechanical fingers toward and away from one another in the passive state of actuation and in the grasping state of actuation, the base, the at least two phalanges and the transmission linkage of each of the mechanical fingers remaining in the constant orientation relative to one another through displacement of the base caused by the actuator absent a contact of one of the phalanges with an object.

* * * * *